United States Patent
Komori (10) Patent No.: US 8,895,488 B2
(45) Date of Patent: Nov. 25, 2014

(54) SLIDING STRUCTURAL MEMBERS

(75) Inventor: Kentaro Komori, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/990,635

(22) PCT Filed: Nov. 17, 2011

(86) PCT No.: PCT/JP2011/076554
§ 371 (c)(1), (2), (4) Date: May 30, 2013

(87) PCT Pub. No.: WO2012/073717
PCT Pub. Date: Jun. 7, 2012

(65) Prior Publication Data
US 2013/0252860 A1   Sep. 26, 2013

(30) Foreign Application Priority Data
Nov. 30, 2010 (JP) .................. 2010-267110

(51) Int. Cl.
*F16C 33/02* (2006.01)
*F16C 33/20* (2006.01)
(Continued)

(52) U.S. Cl.
CPC ........ *C10M 169/042* (2013.01); *F05C 2253/08* (2013.01); *C10M 163/00* (2013.01); *C23C 30/00* (2013.01); *C10M 2219/068* (2013.01); *C10M 141/10* (2013.01); *C10N 2210/06* (2013.01); *F16C 33/24* (2013.01); *C10N 2230/06* (2013.01); *F16J 9/26* (2013.01); *C10M 2219/08* (2013.01); *C10N 2240/12* (2013.01); *C10M 2227/09* (2013.01); *C10N 2210/02* (2013.01); *C10N 2240/14* (2013.01); *C10N 2240/04* (2013.01); *C10N 2280/00* (2013.01); *C10N 2240/10* (2013.01); *F02F 1/20* (2013.01); *F16J 1/16* (2013.01); *F16J 7/00* (2013.01); *C10M 2219/046* (2013.01); *C10M 2223/045* (2013.01)
USPC ............................................. 508/108; 508/109

(58) Field of Classification Search
USPC .................................................. 508/108, 109
See application file for complete search history.

(56) References Cited

U.S. PATENT DOCUMENTS 5,949,612 A * 9/1999 Gudeman et al. .......... 360/97.11
2004/0234770 A1  11/2004 Mori et al.
(Continued)

FOREIGN PATENT DOCUMENTS

JP   2005-002888 A   1/2005
JP   2005-098289 A   4/2005
(Continued)

OTHER PUBLICATIONS

International Search Report for PCT/JP2011/076554, mailing date of Jan. 24, 2012; With English translation.

*Primary Examiner* — Vishal Vasisth
(74) *Attorney, Agent, or Firm* — Westerman, Hattori, Daniels & Adrian, LLP (57) ABSTRACT

A sliding structural member is provided which achieves a good low frictional property. A DLC film 2 containing hydrogen is provided on one member 11 between members sliding against each other, and the one member and a counterpart member 12 are combined in such a way that the DLC film 2 provided on the one member 11 slides against the counterpart member via a lubricant 3 to which organic molybdenum compound and compound containing zinc and sulfur are added as an additive. A root mean square roughness of a surface of the DLC film 2 is set in a range from 5 nm or more to 25 nm or less, and hydrogen content of the DLC film 2 is set in a range from 4.5 at % (atomic %) or more to 30 at % or less.

1 Claim, 7 Drawing Sheets

(51) Int. Cl.
  *C04B 35/52* (2006.01)
  *C10M 163/00* (2006.01)
  *C23C 30/00* (2006.01)
  *C10M 169/04* (2006.01)
  *C10M 141/10* (2006.01)
  *F16C 33/24* (2006.01)
  *F16J 9/26* (2006.01)
  *F16J 1/16* (2006.01)
  *F16J 7/00* (2006.01)
  *F02F 1/20* (2006.01)

(56) References Cited

U.S. PATENT DOCUMENTS

2005/0084390 A1 4/2005 Ueno et al.

2007/0105726 A1* 5/2007 Sawyer et al. ............... 508/106

FOREIGN PATENT DOCUMENTS

| JP | 2007-099947 A | 4/2007 |
| JP | 2008-081630 A | 4/2008 |
| JP | 2008-195903 A | 8/2008 |
| JP | 2008-255160 A | 10/2008 |
| JP | 2008-297477 A | 12/2008 |
| JP | 2009-079138 A | 4/2009 |
| JP | 2009-084579 A | 4/2009 |
| JP | 2009-114311 A | 5/2009 |

* cited by examiner

SLIDING STRUCTURAL MEMBERS

This application is a 371 of PCT/JP2011/076554, filed Nov. 17, 2011.

TECHNICAL FIELD

The present invention relates to a sliding structural member used for a power plant and a power transmission device, etc. More specifically, the present invention relates to a sliding structural member having an amorphous hard carbon film that contains hydrogen and is provided on either one member between members sliding against each other. Herein, the sliding structural member has the amorphous hard carbon film provided on the one member sliding against a counterpart member via a lubricant.

BACKGROUND ART

With regard to sliding structural members used for a power plant and a power transmission device, etc., a research is energetically developed to reduce friction for the purpose of the protection of the global environment. Such a research is directed to a protection of sliding members which slide against each other and improvement of fuel efficiency, and various schemes have been proposed.

As for the above mentioned directions, a scheme is proposed which allows an amorphous hard carbon film (also referred to as a diamond-like carbon film (DLC film)), graphite (graphite) and molybdenum disulfide ($MoS_2$) to coexist. Here, $MoS_2$ is known as a material having a layered crystal structure and as a material which can accomplish an excellent lubrication effect since it slides in a certain direction when a heavy load is applied.

As an example of such a scheme, Patent Document 1 discloses the use of an amorphous hard carbon film (described as an amorphous carbon coated film in Patent Document 1). Herein, the amorphous hard carbon film has the ratio (strength ratio) between an amorphous structure and a graphite structure limited within a predetermined range and $MoS_2$ of equal to or greater than a predetermined amount.

Further, with respect to other schemes, proposed are addition of a predetermined component to an amorphous hard carbon film and a lubricant so as to suppress a chemical reaction in molybdenum oxide, limitation of a counterpart member, and adoption of an additional specific system.

For example, Patent Document 2 discloses that sulfur, magnesium, titanium or calcium component is added to an amorphous hard carbon film (described as an amorphous carbon coated film in Patent Document 2). Moreover, for example, Patent Document 3 discloses that copper dithiophosphate (Cu-DTP) is added to a lubricant. Patent Document 4 discloses a limitation of a ceramic coating film applied to a counterpart member. Patent Document 5 discloses an addition of a specific cooling system.

Furthermore, as another scheme, proposed is a use of an amorphous hard carbon film having hydrogen content regulated to a low level and a lubricant.

Patent Document 6 discloses, as an example such a scheme, an amorphous hard carbon film (described as a hard carbon thin film in Patent Document 6) having hydrogen content set to be 25 mass % or less, more preferably, 5 mass % or less, and further preferably, 0.5 mass % or less, and still further preferably, containing no hydrogen.

PRIOR ART DOCUMENTS

Patent Literatures

Patent Document 1: JP 2007-99947 A
Patent Document 2: JP 2008-195903 A
Patent Document 3: JP 2008-255160 A
Patent Document 4: JP 2009-114311 A
Patent Document 5: JP 2009-79138 A
Patent Document 6: JP 2005-2888 A

DISCLOSURE OF INVENTION

Problems to be Solved by the Invention

However, Patent Document 1 provides few details about the presence ratio of reaction products by a chemical reaction and the mechanism thereof. In addition, there is a leeway for a further improvement of accomplishing a low frictional property. Moreover, the fact that molybdenum oxide to be generated promotes chemical wear of an amorphous hard carbon film, resulting in a possible deterioration of a frictional property, is not taken into consideration.

Moreover, like the disclosures of Patent Documents 2 to 5, there is another disadvantage that addition of a predetermined component to an amorphous hard carbon film and a lubricant, limitation of a counterpart member, and adoption of an additional specific system increase the number of manufacturing processes and limit manufacturing schemes and application ranges, thereby increasing costs.

Furthermore, when an amorphous hard carbon film containing a little hydrogen like Patent Document 6 is used, the amorphous hard carbon film can have an excellent wear resistance, while at the same time, a manufacturing scheme is limited. As a result, there is a disadvantage that a material and shape of a member to be coated are limited. In addition, such an amorphous hard carbon film potentially shows an extremely high hardness, so that the surface thereof tends to be excessively rough. According to Patent Document 6, these factors are not controlled at all. Accordingly, when used with a lubricant, the amorphous hard carbon film has high aggressiveness to a counterpart member, and thus the amorphous hard carbon film is not preferable as sliding structural members. In order to solve such a disadvantage, a polishing process, etc., after film-formation, is necessary, resulting in the increase of costs.

The present invention has been made in view of the above-mentioned disadvantages, and it is an object of the present invention to provide a sliding structural member capable of accomplishing an excellent low frictional property.

Means for Solving the Problems

Researches earnestly made by the inventors of the present invention have resulted in paying attention that, since amorphous hard carbon film is an amorphous (amorphous) material, the amorphous hard carbon film is very smooth macroscopically but has microscopically minute irregularities, the shape and roughness of the amorphous hard carbon film vary, and a generation of molybdenum sulfide ($MoS_2$) which can accomplish a good lubricity requires a certain level of energy caused by frictional force and pressure. Hence, the inventors have found that the above-described problems can be addressed by controlling the hardness of the amorphous hard carbon film and the surface roughness thereof within a certain range, leading to the completion of the present invention.

According to the present invention that has addressed the above-described problems, a sliding structural member includes members sliding against each other, the one member includes an amorphous hard carbon film containing hydrogen provided on the one member, and the one member and a counterpart member are combined in such a way that the amorphous hard carbon film provided on the one member slides against the counterpart member via a lubricant to which organic molybdenum compound and compound containing zinc and sulfur are added as an additive. A root mean square roughness of a surface of the amorphous hard carbon film is set in a range from 5 nm or more to 25 nm or less, and hydrogen content of the amorphous hard carbon film is set in a range from 4.5 at % or more to 30 at % or less.

Accordingly, a root mean square roughness of a surface of the amorphous hard carbon film provided on the one member is controlled within a certain range, and hydrogen content of the amorphous hard carbon film is also controlled within a certain range. As a result, a frictional heat and pressure can be set appropriately which are generated when the amorphous hard carbon film provided on the one member and the counterpart member slide against each other via the lubricant. Hence, a lubricating form maintaining a low friction and a little wear condition can be accomplished, enabling an obtainment of a good low frictional property. It is thought that such a lubricating form is accomplished by causing the organic molybdenum compound contained in the lubricant and the compound containing zinc and sulfur to react chemically with each other by frictional heat and pressure to actively generate $MoS_2$ from molybdenum ion (e.g., $Mo^{4+}$) and a sulfur ion ($S^{2-}$) produced in the lubricant, thereby suppressing a generation of molybdenum oxide, such as $MoO_2$ and $MoO_3$, and as a result, a condition in which more $MoS_2$ are contained is accomplished, and by causing a carbon component of the amorphous hard carbon film to be structurally changed into a graphitic (carbon graphite) component by friction between the amorphous hard carbon film and the counterpart member as is known generally, and to cause the graphitic component to be adhered to the surface of the counterpart member to form a good tribofilm. The tribofilm is deemed as a nano-level surface film formed on a sliding surface by a physicochemical effect of the amorphous hard carbon film and the lubricant. When the tribofilm is formed, direct contact of the sliding surfaces of the members sliding against each other can be prevented, and thus low friction and a little wear condition can be maintained. That is, it can be said that the tribofilm and $MoS_2$ are friction products for achieving a good low frictional property.

Effect of the Invention

According to the present invention, by controlling the root mean square roughness of the surface of the amorphous hard carbon film and the hydrogen content of the amorphous hard carbon film within a certain range, $MoS_2$ can be actively generated from the organic molybdenum compound and the compound containing zinc and sulfur contained in the lubricant, while suppressing a generation of molybdenum oxide. Moreover, the tribofilm is formed on the surface of the counterpart member, and thus the sliding structural member can be provided which achieves a good low frictional property.

BEST MODE FOR CARRYING OUT THE INVENTION

According to the major feature of the present invention, a surface roughness and hydrogen content of an amorphous hard carbon film are controlled within a specific range so that frictional force and pressure generated by sliding between an amorphous hard carbon film provided on one member and a counterpart member produce $MoS_2$ having a more excellent frictional property than those of $MoO_2$ and $MoO_3$ from an additive added to a lubricant.

Hereinafter, an embodiment for carrying out a sliding structural member according to the present invention will be explained in details with reference to the drawings as needed.

Figure 1A:
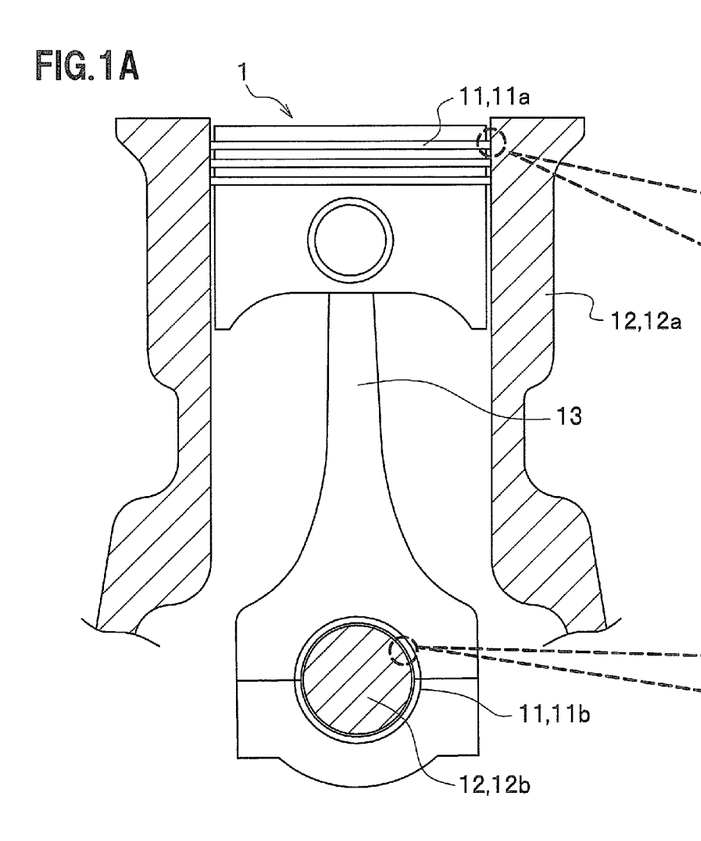
FIG. 1A is a cross-sectional view illustrating a major part of an automobile engine indicating an example sliding structural member according to an embodiment of the present invention.

FIG. 1A is a cross-sectional view illustrating a major part of an automobile engine indicating an example sliding structural member according to an embodiment of the present invention.

As illustrating in FIG. 1A, the sliding structural member 1 according to an embodiment of the present invention has an amorphous hard carbon film (hereinafter, referred to as a "DLC film") 2 containing hydrogen and provided on either one member between members sliding against each other. The sliding structural member 1 is composed in such a way that the DLC film 2 provided on the one member 11 slides against a counterpart member 12 via a lubricant 3 to which an organic molybdenum compound and a compound containing zinc and sulfur are added as an additive.

Moreover, according to the present invention, a root mean square roughness of the surface of the DLC film 2 provided on the sliding structural member 1 is set in a range from 5 nm or more to 25 nm or less, and the hydrogen content in the DLC film 2 in a range from 4.5 at % (atomic %) or more to 30 at % or less.

Example objects to which the sliding structural member 1 according to the present invention is applied are a power plant and power transmission device, etc., having the one member 11 and the counterpart member 12 thereinside sliding against each other via the lubricant (lubricating oil) 3. Example power plants are a heat engine including an internal combustion engine, such as an automobile engine and a gas turbine, and an external combustion engine, such as a steam engine and a steam turbine, a motor (electric motor), and fluid machinery, such as a hydraulic cylinder, a windmill and a water wheel. Moreover, an example power transmission device is a transmission, etc., connected to the above-described power plants.

Figure 1B:
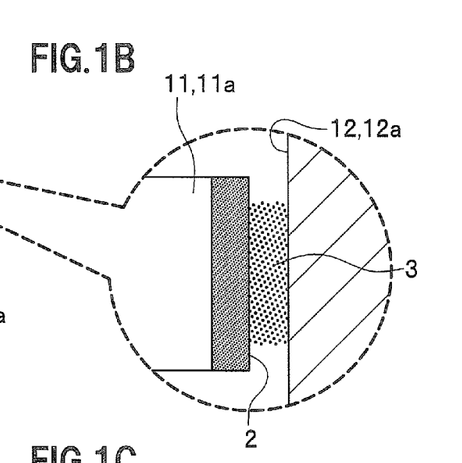
FIGS. 1B and 1C are enlarged cross-sectional views of the major part illustrated in FIG. 1A.
Figure 1C:
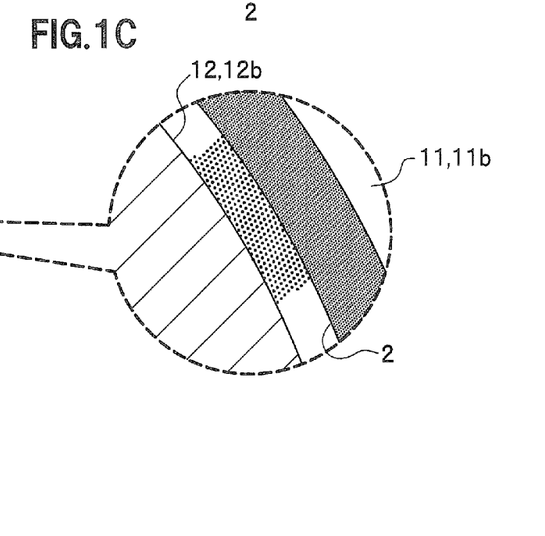

An explanation will be given of a specific example, and in the case of the sliding structural member 1 (automobile engine) illustrated in FIGS. 1A to 1C, for example, the above-described member 11 corresponds to a piston ring 11a, and the counterpart member 12 corresponds to a cylinder 12a. Moreover, the member 11 corresponds to a connecting rod bearing 11b used between a crankshaft 12b and a connecting rod 13, and the counterpart member 12 corresponds to the crank shaft 12b. It is needless to say that in the example cases described above, the member 11 on which the DLC film is provided may be a cylinder, the counterpart member 12 may be the piston ring, the member 11 on which the DLC film 2 is provided may be the crankshaft, and the counterpart member 12 may be the connecting rod bearing. The sliding structural members 1 according to the present invention include any combinations of members, such as a shaft member, a bearing, and a gear having the members sliding against each other. An example member 11 on which the DLC film 2 is provided is a piston pin, a piston groove, and a skirt portion in addition to the above examples.

It is appropriate if the sliding structural members 1 have the DLC film 2 provided on a portion of the one member 11 between members sliding against each other, and such a portion sliding against the counterpart member 12. By providing the DLC film 12 on the portion which slides against the counterpart member 12, the sliding structural member 1 can improve its low frictional property. It is to be noted that the DLC film 2 may be provided on the member 11 entirely. This makes it possible to, not only improve a low frictional property, but also to accomplish improvement of high hardness, improving chemical stability, surface smoothness, mold releasability, and anti-seizure quality, etc. Accordingly, when the piston ring is the member 11, as illustrated in FIG. 1B, the DLC film 2 may be provided on the outer circumferential surface of the piston ring, but the DLC film 2 can be provided across the whole surface of the piston ring.

It is preferable that the member 11 and counterpart member 12 should be members formed of iron and steel including a so-called common steel and special steel since such materials facilitate an additive added to the lubricant 3 to be absorbed at the surfaces thereof, thereby obtaining a good lubricity but may be members of non ferrous metals or members of ceramics. The lubricant 3 and the additive will be described later.

Example common steels are rolled steels for general structure (SS material), rolled steels for welded structure (SM material), steels for boilers and pressure vessels (SB material), steel plates and steel strips for high pressure gas vessels (SG material), hot rolled steels and steel strips (SPH material), hot rolled carbon steel strip for pipes and tubes (SPHT material), hot rolled steel plates and steel stripes for automobile structure (SAPH material), cold rolled steel plates and steel stripes (SPC material), etc., standardized in Japan Industrial Standards Committee (JIS).

In addition, example special steels are preferably high carbon chromium bearing steels (SUJ2 material), and chrome-molybdenum steels (SCM material), but may be carbon steels for machine structure (S—C material), carbon tool steels (SK material), alloy tool steels for cutting tools (SKS material), alloy tool steels for cold dice (SKD material), alloy tool steels for hot die and mold (SKT material), high speed tool steels (SKH material), carbon chromium bearing steels (SUJ material), spring steels (SUP material), stainless steels (SUS material), heat-resistant steels (SUH material), carbon steel plates for pressure vessels for constant temperature service (SLA material), steels for magnetic core and magnetic steels, forged steels (SF material), cast steels (SC material), and iron castings (FC material), etc.

Example non ferrous metals are aluminum, magnesium, titanium or an alloy mainly composed of any one of those materials.

Example aluminum or aluminum alloy are pure Al (1000 series), Al—Cu, Al—Cu—Mg series alloy (2000 series), Al—Mn, Al—Mn—Mg series alloy (3000 series), Al—Si—Cu—Mg—Ni, Al—Si series alloy (4000 series), Al—Mg series alloy (5000 series), Al—Mg—Si series alloy (6000 series), Al—Zn—Mg—Cu, Al—Zn—Mg series alloy (7000 series), Al—Cu alloy (AC1A), Al—Cu—Mg series (AC1B), Al—Cu—Mg—Ni alloy (AC5A), Al—Si alloy (AC3A, ADC1), Al—Cu—Si alloy (AC2A, AC2B), Al—Si—Cu alloy (AC4B, ADC10, ADC12), Al—Si—Mg alloy (AC4C, AC4CH, ADC3) Al—Si—CU—Mg—Ni alloy (AC8A, AC8B, AC8C, AC9A, AC9B, ADC14), and Al—Mg alloy (AC7A, ADC5, ADC6), etc., standardized in JIS.

Example magnesium or magnesium alloy are one to seven kinds standardized in JIS.

Moreover, example titanium or titanium alloy are one to four kinds standardized in JIS.

It is appropriate if the member 11 and counterpart member 12 are formed by materials appropriately selected from the materials described above according to the application. In other words, the member 11 and counterpart member 12 may be formed of the same material selected among the above-described ones. Alternatively, the member 11 and counterpart member 12 may be formed of different materials.

It is appropriate if the surface roughness of a part of the counterpart member 12 sliding against the member 11 should be within a range where the counterpart member 12 is used as a general sliding structural member. For example, it is appropriate if the surface of the counterpart member 12 should be only subjected to a finish-work having a calculated average roughness (Ra) of subsequently 1.6 µm or less and a ten-point average roughness ($Rz_{jis}$) of subsequently 6.3 µm or less. When the surface roughness of the counterpart member 12 is controlled to be equal to or smaller than the values described above, good frictional force can be obtained.

The calculated average roughness (Ra) and ten-point average roughness ($Rz_{jis}$) can be measured in accordance with JIS B0601:2001, and can be easily measured when a measuring device based on this compliance is used.

As described above, according to the present invention, the root mean square roughness (Rq) of the surface of the DLC film 2 provided on the member 11 is set in a range from 5 nm or more to 25 nm or less. When the root mean square roughness of the surface of the DLC film 2 is within this range, it is preferable since good frictional force can be obtained, while at the same time, aggressiveness to the counterpart member does not become excessively high.

When the root mean square roughness of the surface of the DLC film 2 is smaller than 5 nm, the surface becomes too smooth to obtain sufficient frictional force. Hence, it is difficult to produce $MoS_2$ and to obtain a good low frictional property. Conversely, when the root mean square roughness of the surface of the DLC film 2 exceeds 25 nm, the surface becomes excessively rough, aggressiveness to the counterpart member becomes excessively high, and thus the wear of the counterpart member 12 increases. It is preferable that the root mean square roughness of the surface of the DLC film 2 should be set in a range from 5.2 nm or more to 24 nm or less, and more preferably, from 7.3 nm or more to 19 nm or less.

The root mean square roughness [nm] is measured using an atomic force microscope (AFM), and calculated from an obtained result in accordance with JIS B0601:2001.

Moreover, according to the present invention, the hydrogen content in the DLC film 2 provided on the member 11 is set in a range from 4.5 at % or more to 30 at % or less. When the hydrogen content of the DLC film 2 is within this range, the DLC film 2 is not too hard and nor too soft, but has a moderate hardness for the present invention. This facilitates generation of appropriate frictional heat and pressure when the DLC film 2 slides against the counterpart member 12. Accordingly, the organic molybdenum compound and the compound containing zinc and sulfur in the lubricant 3 are likely to chemically react with each other, thereby enabling an active generation of $MoS_2$. Hence, a lubricating form maintaining a low friction and a little wear condition can be easily accomplished, enabling an obtainment of a good low frictional property.

When the hydrogen content of the DLC film 2 is smaller than 4.5 at %, in general, the DLC film 2 tends to become hard and to become more aggressive to the counterpart member, thereby increasing wear of the counterpart member 12.

Conversely, when the hydrogen content of the DLC film 2 exceeds 30 at %, the DLC film 2 has a hardness within a relatively moderate range. However, since the DLC film contains much hydrogen, various chemical reactions are likely to occur. Particularly, $MoO_2$ and $MoO_3$ produced as by-products cause a chemical reaction with hydrogen which is present abundantly in the DLC film, to produce metal molybdenum (Mo), and cause another chemical reaction with a carbon derived from the DLC film 2 to produce molybdenum carbide ($Mo_2C$). Production of those materials means that hydrogen and carbon act as a reducing agent to advance the chemical reaction, i.e., the DLC film 2 is chemically worn out, which is not preferable.

When the hydrogen content of the DLC film 2 becomes 40 at % or more, the DLC film 2 is too soft for the present invention. Accordingly, when the DLC film 2 and the counterpart member 12 slide against each other, appropriate frictional heat and pressure cannot be generated. Hence, it is difficult for the organic molybdenum compound and the compound containing zinc and sulfur in the lubricant 3 to cause a chemical reaction. As a result, a good low frictional property cannot be obtained. It is preferable that the upper limit of the hydrogen content of the DLC film 2 should be set to 28.8 at % or less, more preferably 26.1 at % or less, further preferably 18.4 at % or less, and still further preferably 17.7 at % or less.

The hydrogen content in the DLC film 2 can be measured through, for example, the Rutherford Backscattering Spectrometry (Rutherford Backscattering Spectrometry; RBS).

Hardness of the DLC film 2 and Young's modulus thereof can be measured through the nanoindentation technique (nanoindenter) in accordance with ISO 14577, and can be calculated highly accurately.

Such a DLC film 2 can be formed by, for example, plasma CVD (Chemical Vapor Deposition) using hydrocarbon gases, such as methane ($CH_4$), acetylene ($C_2H_2$), benzene ($C_6H_6$) and toluene ($C_7H_8$), as raw materials, so as to have large hydrogen content. Moreover, the DLC film can be formed by PVD (Physical Vapor Deposition) using, for example, a solid carbon as a raw material, so as to have small hydrogen content. Through which technique the DLC film 2 is formed can be selected appropriately according to a desired amount of hydrogen content. Moreover, the hydrogen content in the DLC film 2 can be arbitrarily adjusted within a range from 4.5 at % or more to 30 at % or less by changing film-forming conditions, such as a raw material, pressure, film-forming time, biasing voltage, and plasma intensity, etc.

The root mean square roughness of the surface of the DLC film 2 can be controlled by a combination of a device condition, such as raw gas species to be used and biasing voltage to be applied, and film-forming time. For example, in the case of plasma CVD using $CH_4$, $C_2H_2$, $C_6H_6$ and $C_7H_8$ as raw gas materials, when pressure, biasing voltage of the member 11, plasma output, and film-forming time are set to 0.1 to 5 Pa, 400 to 2000 V, 20 to 200 W, and 20 to 260 min, respectively, the root mean square roughness of the surface of the DLC film 2 can be adjusted arbitrary within a range from 5 nm or more to 25 nm or less. Moreover, in the case of PVD using a solid carbon, when, for example, pressure is set to $10^{-3}$ Pa or less, biasing voltage of the member 11 is set to substantially 100 V, arc-voltage is set to substantially 80 V, and film-forming time is set to substantially 100 min, the root mean square roughness of the surface of the DLC film 2 can be adjusted within a range from 5 nm or more to 25 nm or less.

The lubricant 3 to be used is the one to which the organic molybdenum compound and the compound containing zinc and sulfur are added as an additive. According to the present invention, addition of these additives to the lubricant 3 enables a formation of the lubricating form maintaining low friction and a little wear condition by the frictional force and the pressure generated when the DLC film 2 provided on the member 11 slides against the counterpart member 12.

The organic molybdenum compound is normally dissolved in the lubricant 3, and causes a chemical reaction by the frictional force and the pressure generated when the DLC film 2 and the counterpart member 12 slide against each other to produce $MoS_2$. Accordingly, the organic molybdenum compound functions, as a so-called friction modifier (friction modifier) that maintains low frictional and a little wear conditions. Moreover, the organic molybdenum compound also has a function of improving wear resistance, extreme pressure property, and oxidation resistance.

Example organic molybdenum compounds applicable are molybdenum dialkyldithiocarbamate, and dithiophosphate molybdenum, etc. Such organic molybdenum compound in solo or combined such organic molybdenum compounds can be added to the lubricant 3 at an arbitrary additive amount.

The compound containing zinc and sulfur has a function of improving a low frictional property (extreme pressure agent) as well as functions as an antioxidizing agent and a corrosion inhibitor.

Example compounds containing zinc and sulfur and appropriately applicable are zinc dialkyldithiophosphate and zinc dialkyldithiocarbamate which are composed of alkyl groups, such as isopropyl, butyl, 2-ethylhexyl, isotridecyl or stearyl, or mixture thereof, etc. The compound containing zinc and sulfur can be added to the lubricant 3 at a given additional amount.

Moreover, with respect to the additive, it is preferable that a cleaning agent, such as Ca sulfonates or Mg sulfonates, should be added to the additive. Addition of the cleaning agent prevents insoluble contents, such as oxidation products and high molecular weight polymer, from becoming a sludge.

According to a purpose, in addition to the above-described cleaning agent, following additives can be added within a range not disturbing the desired advantage of the present invention: an antioxidizing agent, such as phenol groups, amine groups, and sulfide; a viscosity index improver, such as polymethacrylate, ethylene-propylene copolymer, stylene-butadiene copolymer, and polyolefin series; a friction modifier, such as a fatty acid, fatty acid ester, phosphate ester, and molybdenum disulfide; a dispersing agent, such as succinimide, succinate ester, and amine groups; a pour point depressant, such as polymethacrylate, alkylnaphthalene, and phenol groups; an extreme pressure agent, such as phosphate ester and sulfur compounds; antifoamer, such as alcohol and silicon (dimethylsiloxane); a rust inhibitor, such as alkaline-earth metal salts, sulfonate groups (alkali), alcohol, and amine groups; a corrosion inhibitor, such as zinc dithiophosphate, zinc, and S—P compound; an oiliness agent, such as ester, alcohol, fats, and organic acid; and, a coloring agent, such as aromatic compound. These additives including the above-described cleaning agents, such as Ca sulfonates and Mg sulfonates, are generally added to an engine oil used for an automobile engine.

Example base oils (base oil) that are the basis of the lubricant 3 are synthetic oil, mineral oil, semi-synthetic oil, and vegetable oil.

The lubricant oil 3 may be not only in a liquid like an engine oil for an automobile engine, but also a grease which has a thickener added thereto so as to improve the viscosity.

According to the above-described sliding structural member 1, the root mean square roughness of the surface of the DLC film 2 and the hydrogen content of the DLC film 2 are controlled within a particular range. Accordingly, $MoS_2$ can be actively generated from the organic molybdenum compound contained in the lubricant 3 and the compound containing zinc and sulfur, while suppressing a generation of molybdenum oxide. Hence, the sliding structural member 1 has a good low frictional property.

Moreover, according to the sliding structural member 1, it is unnecessary to add a predetermined component to the DLC film 2 and the lubricant 3, to limit a material of the counterpart member 12, to adopt a specific structure, and also to carry out a polishing process, etc. Accordingly, the structural member 1 can easily accomplish a good low frictional property without a cost increase.

EXAMPLES

Next, specific examples for examining advantages of the sliding structural member of the present invention will be described.

[1] Verification of Validity of Idea of Present Invention

First of all, in order to verify the validity of the idea of the present invention, first to fourth test pieces were produced by providing an amorphous hard carbon film (DLC film) on each surface of a circular disk member and a ball member (6 mm in diameter) accordingly, and a friction test was carried out to measure each friction coefficient.

Figure 2A:
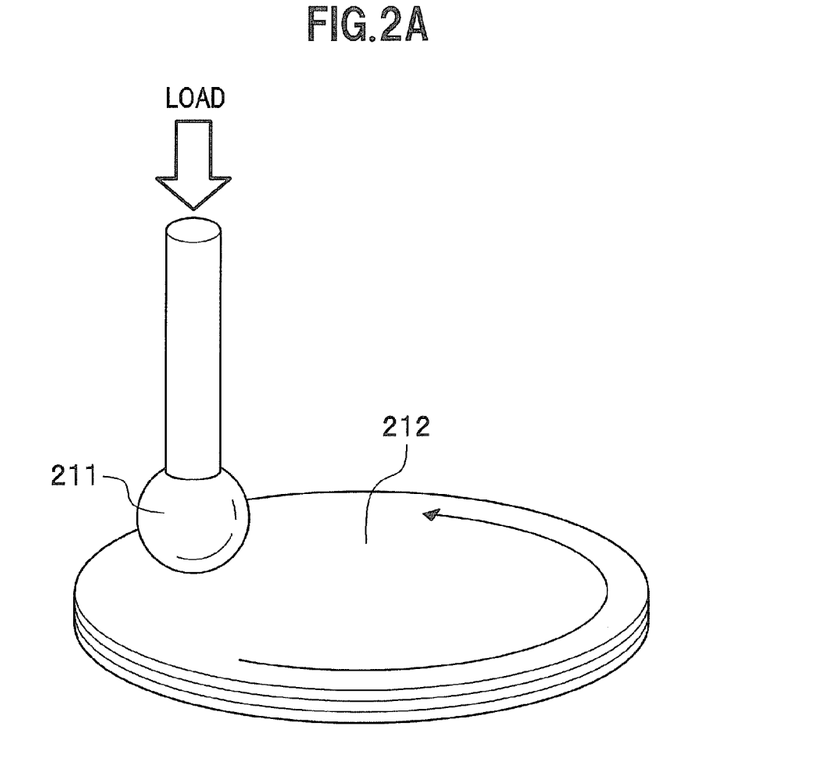
FIG. 2A is an explanatory diagram for explaining how a friction test was carried out.

The friction test was carried out through a ball-on-disk friction wear test illustrated in FIG. 2A. The test was carried out with load to the ball member 211: 5 N (=1.1 GPa), sliding speed (rotation speed of the disk member 212): 100 mm/second, temperature: room temperature (40° C.), and 10000 cycles (50 minutes), using a lubricant and an additive indicated in Table 1. The viscosity of a base oil and an engine oil used as a lubricant was 0W-20.

Table 1 below indicates specifications of the first to the fourth test pieces, lubricants, and results of friction coefficients after 10000 cycles measured through the friction test.

"SUJ2 member" in Table 1 indicates high carbon chromium bearing steel, and "DLC" indicates that the DLC film was provided on the surface of the SUJ2 member.

The DLC film indicated in Table 1 was formed through plasma CVD technique. The conditions of plasma CVD technique were as follows: raw gas: acetylene gas ($C_2H_2$); pressure: 0.4 Pa, film-forming time: 90 min, biasing voltage to a disk member: 2000 V; and plasma output: 20 W.

Moreover, the engine oil in Table 1 was commercially available one and added with additives that were molybdenum dithiocarbamate as organic molybdenum compound and zinc dialkyl dithiophosphate as compound containing zinc and sulfur. In contrast, the base oil was not added with these additives. The engine oil and the base oil contained a sulfur ingredient and a sulfide ingredient derived from mineral oil and Ca sulfonates as a cleaning agent.

TABLE 1

| | Disk Member | Ball Member | Lubricant | Friction Coefficient |
| --- | --- | --- | --- | --- |
| 1st Test Piece | DLC | SUJ2 Member | Engine Oil | 0.041 |
| 2nd Test Piece | SUJ2 Member | SUJ2 Member | Engine Oil | 0.126 |
| 3rd Test Piece | DLC | SUJ2 Member | Base Oil | 0.082 |
| 4th Test Piece | DLC | DLC | Engine Oil | 0.078 |

As indicated in Table 1, it becomes clear that the friction coefficient of the first test piece tended to become small since the first test piece had the DLC film provided on the one member (disk member) and used the engine oil to which the additive was added.

In contrast, it becomes clear that the friction coefficients of the second to fourth test pieces tended to become large as compared to the first test piece since the second test piece had both the one member (disk member) and the counterpart member (ball member) formed of SUJ2, the third test piece used the lubricant to which no additives added, and the fourth test piece had the DLC film provided on both of the one member (disk member) and the counterpart member (ball member). Moreover, since the DLC film having a poor adsorptive property of an additive in comparison with the SUJ2 member was formed on both surfaces of the disk member and the ball member, the fourth test piece had a possibility that a wear amount increases.

According to such a verification, it becomes clear that the idea of the present invention was effective which provides the DLC film on the one member (e.g., the disk member 212) but does not provide such a film on the counterpart member (e.g., the ball member 211), and causes these members to slide against each other in the engine oil to which the organic molybdenum compound and the compound containing zinc and sulfur are added as an additive.

Next, based on this idea, the validity of the advantage of the present invention and the conditions for accomplishing those advantages were verified.

[2] Verification of Validity of Advantage and Condition to Accomplish Such Advantage In order to verify the validity of the advantage and the conditions to accomplish such an advantage, first, fifth to 16th test pieces were produced under the conditions indicated in Table 2 below by providing the DLC film on an SUJ2-made disk member with a combination of an SIM-made ball member having no DLC film provided thereon. In Table 2, the first test piece showing good results in the verification [1] was also indicated.

TABLE 2

|  | Film-Forming Method | Raw Gas and Flow Rate [sccm] | | Pressure [Pa] | Biasing Voltage [V] | Plasma Output [W] or Arc Voltage [V] | | Film-Forming Time [min] |
|---|---|---|---|---|---|---|---|---|
| 1st Test Piece | Plasma CVD | $C_2H_2$ | 100 | 0.4 | 2000 | 20 | W | 90 |
| 5th Test Piece | Plasma CVD | $C_2H_2$ | 100 | 0.4 | 2000 | 20 | W | 60 |
| 6th Test Piece | Plasma CVD | $C_7H_8$ | 18 | 2.3 | 500 | 200 | W | 27 |
| 7th Test Piece | Plasma CVD | $C_7H_8$ | 10 | 0.5 | 500 | 200 | W | 45 |
| 8th Test Piece | PVD | Solid Carbon | — | $\leq 10^{-3}$ | 100 | 80 | V | 100 |
| 9th Test Piece | Plasma CVD | $C_7H_8$ | 10 | 0.5 | 500 | 200 | W | 58 |
| 10th Test Piece | Plasma CVD | $C_7H_8$ | 150 | 4.2 | 430 | 68 | W | 60 |
| 11th Test Piece | Plasma CVD | $C_7H_8$ | 44 | 2.3 | 400 | 200 | W | 65 |
| 12th Test Piece | Plasma CVD | $C_7H_8$ | 60 | 3.3 | 400 | 200 | W | 130 |
| 13th Test Piece | Plasma CVD | $C_7H_8$ | 18 | 2.3 | 500 | 200 | W | 260 |
| 14th Test Piece | Plasma CVD | $C_7H_8$ | 100 | 4.9 | 400 | 150 | W | 18 |
| 15th Test Piece | Plasma CVD | $C_7H_8$ | 100 | 4.9 | 400 | 150 | W | 210 |
| 16th Test Piece | PVD | Solid Carbon | — | $\leq 10^{-3}$ | 100 | 200 | V | 150 |

With respect to the DLC films of the first, and fifth to 16th test pieces, hardness, Young's modulus, hydrogen content and root mean square roughness (Rq) were measured, respectively. Moreover, the friction test likewise the verification [1] was carried out to measure a friction coefficient, and the friction surface having undergone the friction test was analyzed. In this verification, the test piece having the friction coefficient of 0.08 or less was taken as a successful result.

The hardness [GPa] and the Young's modulus [GPa] were measured using a nanoindenter in accordance with ISO 14577.

The hydrogen content [at %] was measured through the Rutherford Backscattering Spectrometry (Rutherford Backscattering Spectrometry; RBS). In the RBS, a sample was irradiated with helium (He) ion, and for the hydrogen amount content, in particular, it was calculated based on the detection results of hydrogen rebounded and scattered forwardly.

Regarding the root mean square roughness [nm], an area having a side from 20 μm or more to 50 μm or less was measured using an atomic force microscope (AFM), and the root mean square roughness was calculated based on the obtained results in accordance with JIS B0601: 2001.

Figure 2B:
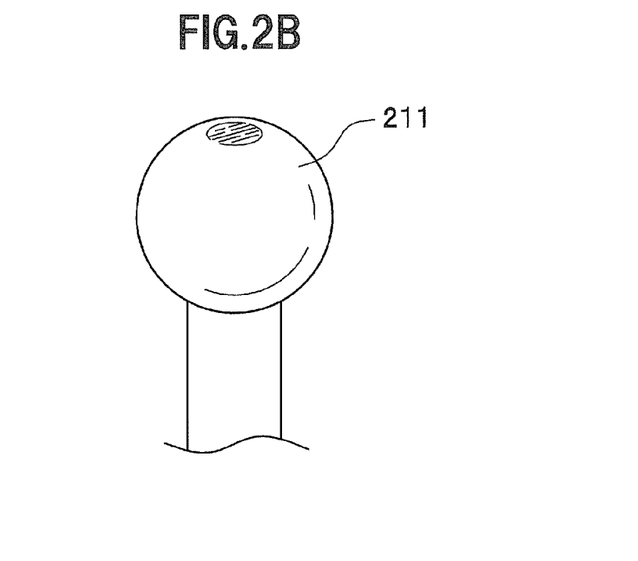
FIG. 2B is an explanatory diagram for explaining a worn surface of a ball member.

With respect to the analysis of the friction surface, after the ball-on-disk friction wear test illustrated in FIG. 2A was carried out on a ball member, the lubricant adhered to the surface of the ball member was carefully cleansed by an organic solvent to remove the lubricant from the ball member. Next, the friction products were analyzed for the worn surface of the ball member illustrated in FIG. 2B through X-ray photoelectron spectroscopy (X-ray Photoelectron Spectroscopy; XPS). As a result, in the analysis through XPS, various elements, such as C, O, Mo, S, Zn, and P, which were derived from the DLC film, the lubricant, and the additive were detected. Among these elements, the presence of Mo which was considered to be derived from molybdenum dithiocarbamate that was an additive was identified in various forms, such as the ion species like $Mo^{4+}$, $Mo^{5+}$, and $Mo^{6+}$, and $Mo^0$.

The Young's modulus, the hydrogen content, the root mean square roughness, the friction coefficient, and the analysis results through XPS of the first, and fifth to 16th test pieces were indicated together in following Table 3 below. Table 3 also indicates $Mo^{4+}$, $Mo^0$, and $S^{2-}$ as the analysis results through XPS, since it is anticipated that $MoS_2$ is formed when $Mo^{4+}$ is bonded with $S^{2-}$. In Table 3, $Mo^{4+}$ is a molybdenum ion, $Mo^0$ is metal molybdenum (Mo) or molybdenum carbide ($Mo_2C$), and $S^{2-}$ is a sulfur ion.

TABLE 3

|  | Hardness [GPa] | Young's Modulus [GPa] | Hydrogen Content [at %] | Root Mean Square Roughness [nm] | XPS Analysis | | | | Friction Coefficient | Note |
|---|---|---|---|---|---|---|---|---|---|---|
|  |  |  |  |  | $Mo^{4+}$ [at %] | $Mo^0$ [at %] | $S^{2-}$ [at %] | $S^{2-}/Mo^{4+}$ Ratio |  |  |
| 1st Test Piece | 18.2 | 170 | 17.7 | 24 | 6.72 | 0.00 | 10.5 | 1.56 | 0.041 | Good |
| 5th Test Piece | 18.0 | 170 | 18.4 | 19 | 3.19 | 0.22 | 7.9 | 2.48 | 0.053 |  |
| 6th Test Piece | 23.9 | 190 | 28.8 | 7.3 | 1.30 | 0.21 | 3.8 | 2.92 | 0.077 |  |
| 7th Test Piece | 31.6 | 208 | 26.1 | 5.2 | 1.34 | 0.15 | 4.7 | 3.50 | 0.076 |  |
| 8th Test Piece | 33.9 | 616 | 4.5 | 12 | 2.05 | 0.03 | 5.6 | 2.74 | 0.058 |  |
| 9th Test Piece | 20.1 | 185 | 26.1 | 4.6 | 0.74 | 0.09 | 4.8 | 6.53 | 0.086 | Large Friction Coefficient |
| 10th Test Piece | 14.1 | 114 | 35.0 | 5.1 | 1.40 | 0.33 | 4.3 | 3.07 | 0.069 | Large $Mo^0$ Fomation |
| 11th Test Piece | 14.7 | 111 | 35.8 | 11 | 2.90 | 0.85 | 5.3 | 1.83 | 0.077 | Amount |
| 12th Test Piece | 11.7 | 87 | 37.2 | 20 | 3.22 | 0.52 | 6.8 | 2.11 | 0.076 | Deteriorated |
| 13th Test Piece | 18.3 | 137 | 31.6 | 15 | 4.76 | 1.33 | 10.2 | 2.14 | 0.060 | $MoS_2$ Effect |
| 14th Test Piece | 9.7 | 74 | 43.4 | 4.7 | 1.15 | 0.18 | 4.6 | 3.96 | 0.085 | Large Friction Coefficient |
| 15th Test Piece | 8.7 | 55 | 43.4 | 30 | 0.17 | 0.00 | 0.7 | 4.41 | 0.087 | Large Friction Coefficient |
| 16th Test Piece | 61.4 | 582 | 0.5 | 28 | 2.21 | 0.00 | 6.5 | 2.94 | 0.070 | High Aggressiveness to Counterpart Member |

In order to verify the validity of the advantage and the conditions to accomplish such an advantage, various considerations were made based on the contents indicated in Table 3.

Figure 3:
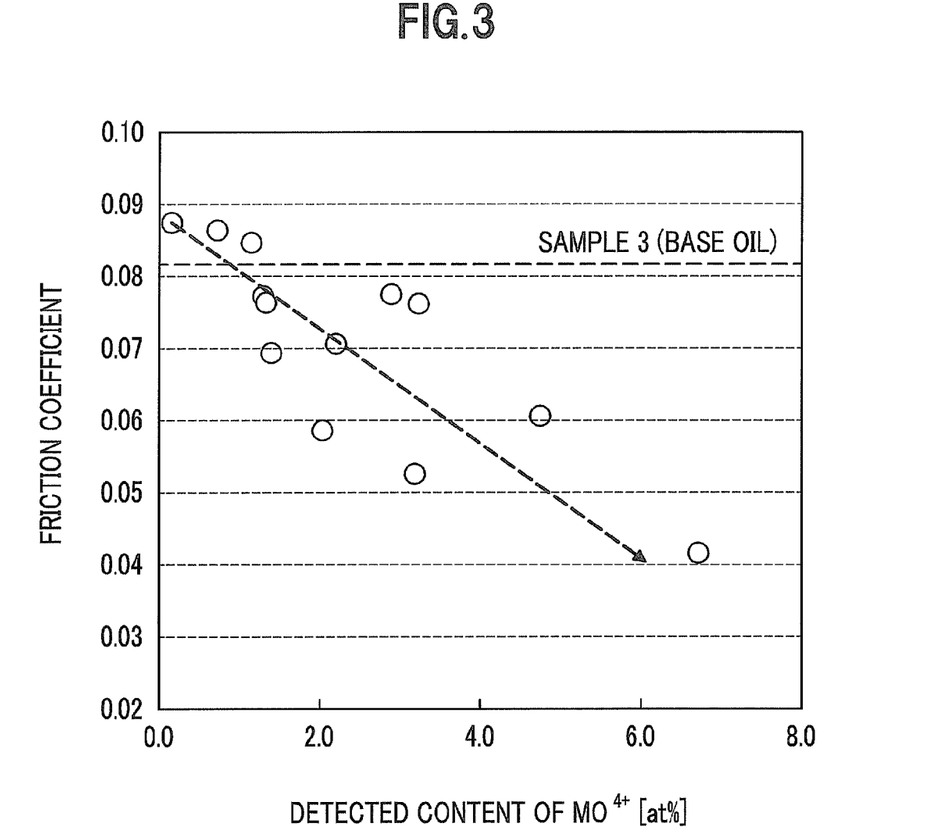
FIG. 3 is a graph plotted so as to indicate a relationship between a detected amount of $Mo^{4+}$ on the ball member and a friction coefficient based on the contents indicated in Table 3.

FIG. 3 is a graph plotted so as to indicate a relationship between a detected amount of $Mo^{4+}$ on the ball member and a friction coefficient based on the contents indicated in Table 3. The horizontal axis indicates the detected amount [at %] of $Mo^{4+}$ on the ball member, and the vertical axis indicates a friction coefficient.

As illustrated in FIG. 3, it became clear that a friction coefficient decreases along with the increase of the amount of $Mo^{4+}$. Since the friction coefficient of the third test piece using the base oil to which no additive was added was 0.082 verified in the verification [1], it is indicated in FIG. 3 for reference.

Figure 4A:
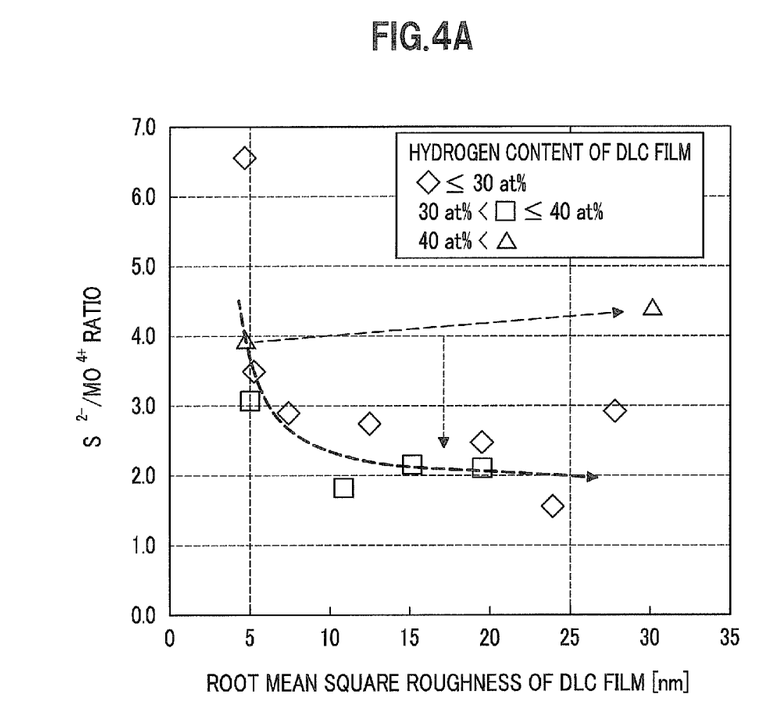
FIG. 4A is a graph plotted so as to indicate a relationship between a root mean square roughness of a DLC film and a ratio of $S^{2-}/Mo^{4+}$ based on the contents indicated in Table 3.
Figure 4B:
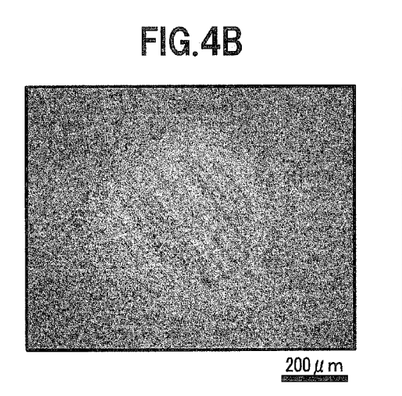
FIG. 4B is a photograph picking up a worn surface of a ball member of a 16th test piece.
Figure 4C:
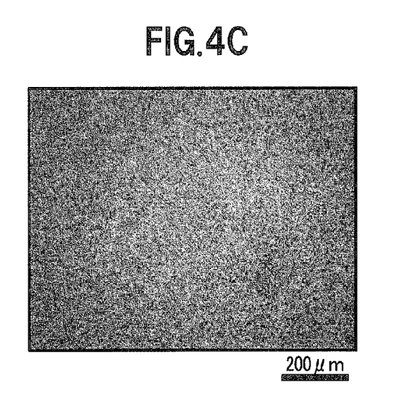
FIG. 4C is a photograph picking up a worn surface of a ball member of a first test piece.

FIG. 4A is a graph plotted so as to indicate a relationship between a root mean square roughness of a DLC film and a ratio of $S^{2-}/Mo^{4+}$ based on the contents indicated in Table 3. FIG. 4B is a photograph picking up the worn surface of the ball member that was the 16th test piece, and FIG. 4C is a photograph picking up the worn surface of the ball member that was the first test piece. The horizontal axis in FIG. 4A indicates the root mean square roughness [nm] of the DLC film, and the vertical axis indicates the ratio of $S^{2-}/Mo^{4+}$. Moreover, in FIG. 4, the "diamond-shaped" plot indicates the hydrogen content of the DLC film in 30 at % or less, the "square-shaped" plot indicates the hydrogen content of the DLC film exceeding 30 at % and 40 at % or less, and the "triangle-shaped" plot indicates the hydrogen content of the DLC film exceeding 40 at %. Furthermore, the scale bars in FIGS. 4B and 4C indicate 200 µm, respectively.

It can be said that the closer the ratio of $S^{2-}/Mo^{4+}$ becomes to 2.0, the more the presence ratio of these ions forming $MoS_2$ is in a preferable condition.

It becomes clear from FIG. 4A when the hydrogen content of the DLC film is 40 at % or less (i.e., the "diamond-shaped" plot and the "square-shaped" plot), $MoS_2$ is likely to be produced well as the root means square roughness of the DLC film becomes more rough. In contrast, when the hydrogen content of the DLC film exceeds 40 at %, when the root means square roughness of the DLC film becomes more rough, such a change that the ratio of $S^{2-}/Mo^{4+}$ becomes closer to 2.0 was not observed. As a result, it is indicated that $MoS_2$ is not likely to be produced well.

Regarding the diamond-shaped plot (more specifically, the 16th test piece) which had the hydrogen content of the DLC film that was 30 at % or less, the root mean square roughness of the DLC film that was 28 nm, and the ratio of $S^{2-}/Mo^{4+}$ that was 2.94 in FIG. 4A, the surface of the ball member that was the counterpart member was highly worn out as compared to the first test piece (see FIGS. 4B and 4C). It can be thought that this is because the surface roughness of the DLC film was too rough, the hydrogen content of the DLC film was small, and the hardness was too high (as indicated in Table 3, the hardness was 61.4 GPa, and the Young's modulus was 582 GPa), thereby becoming more aggressive to the counterpart member. Based on those facts, in order to accomplish the advantage of the present invention, it is indicated that some sort of control to the hydrogen content and the root mean square roughness of the DLC film is necessary.

Figure 5:
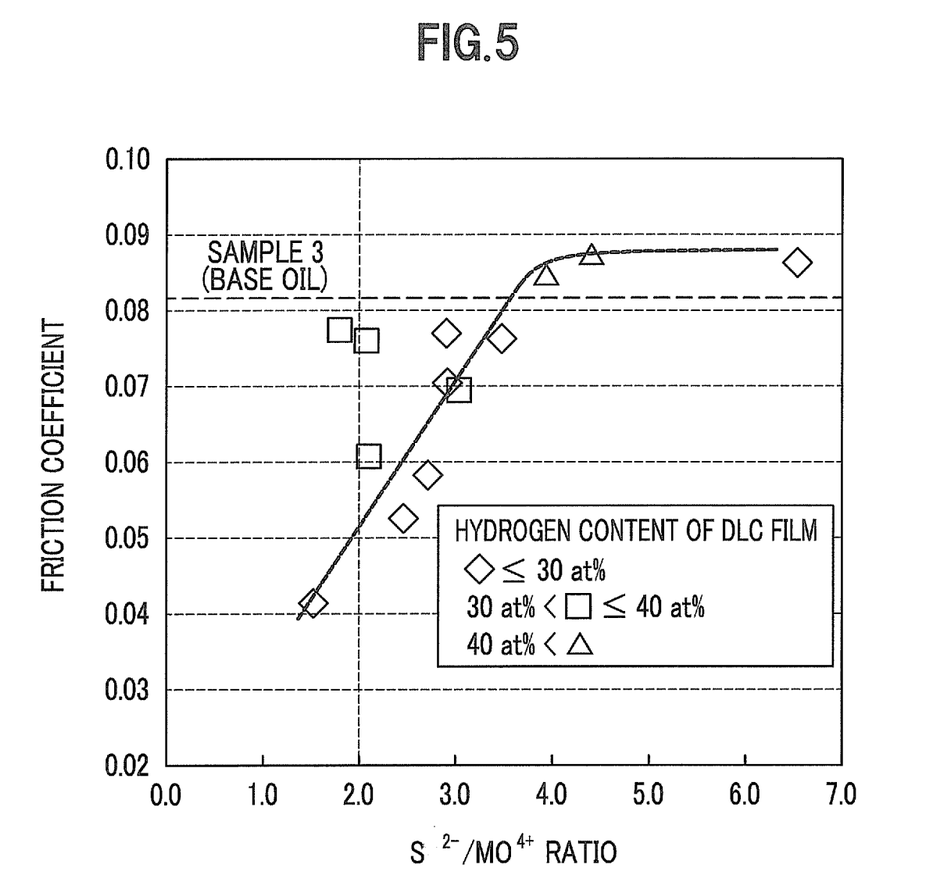
FIG. 5 is a graph plotted so as to indicate a relationship between a ratio of $S^{2-}/Mo^{4+}$ and a friction coefficient based on the contents indicated in Table 3.

FIG. 5 is a graph plotted so as to indicate a relationship between a ratio of $S^{2-}/Mo^{4+}$ and a friction coefficient based on the contents indicated in Table 3. The horizontal axis indicates the ratio of $S^{2-}/Mo^{4+}$, and the vertical axis indicates the friction coefficient. The friction coefficient (0.082) that was the third test piece verified in the verification [1] was indicated in FIG. 5 for reference.

It becomes clear from FIG. 5 that the closer the ratio of $S^{2-}/Mo^{4+}$ becomes to 2.0 and the smaller it becomes, the smaller the friction coefficient becomes, and thus a good correlativity can be obtained. As illustrated in FIG. 5, however, even if the ratio of $S^{2-}/Mo^{4+}$ is around 2.0, when the hydrogen content of the DLC film exceeds 30 at % and is 40 at % or less (square-shaped plot), there are some test pieces which are out of this correlativity and which has the large friction coefficient (more specifically, the 11th and 12th test pieces). It can be thought that the by-products other than $MoS_2$ disturbing the frictional effect of $MoS_2$, such as molybdenum oxide, metal molybdenum, or molybdenum carbide ($Mo^0$), and corrosion of the DLC film affect. Hence, the following study was made.

Figure 6A:
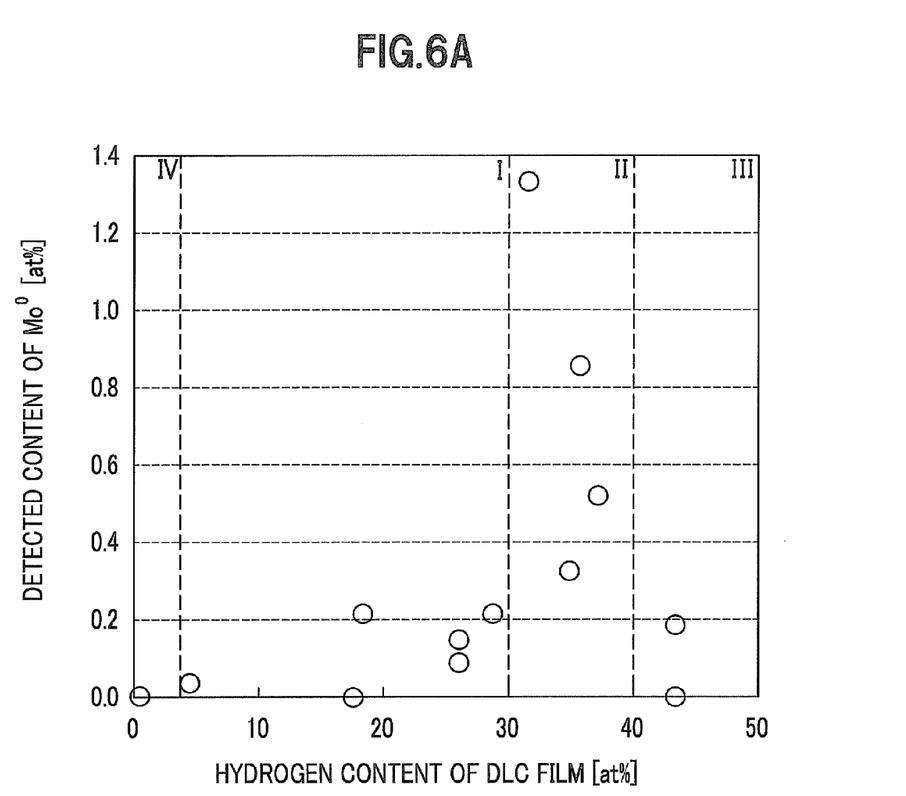
FIG. 6A is a graph plotted so as to indicate a relationship between hydrogen content of the DLC film and a detected amount of $Mo^0$.
Figure 6B:
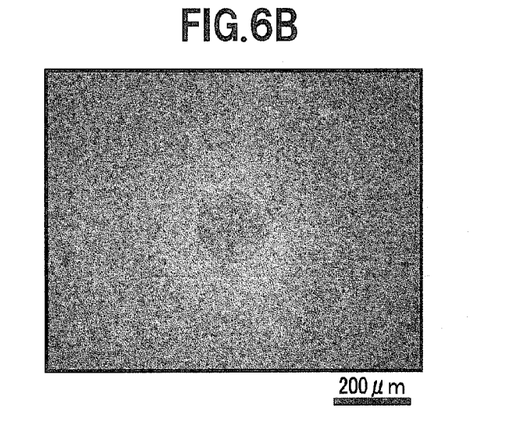
FIG. 6B is a photograph picking up a worn surface of a ball member of an eighth test piece having hydrogen content of the DLC film that was 4.5 at %.

FIG. 6A is a graph plotted so as to indicate a relationship between hydrogen content of the DLC film and a detected amount of $Mo^0$, and FIG. 6B is a photograph picking up a worn surface of the ball member that was the eighth test piece having hydrogen content of the DLC film which was 4.5 at %. The horizontal axis in FIG. 6A indicates the hydrogen content of the DLC film [at %], and the vertical axis indicates the detected amount of $Mo^0$ [at %]. The scale bar in FIG. 6B indicates 200 µM.

As illustrated in FIGS. 6A and 6B, when the hydrogen content of the DLC film was within a range of 30 at % or less (within the range "1" and the range "IV" in FIG. 6A), the detected amount of $Mo^0$ was little (more specifically, the first, fifth to eighth, and 16th test pieces). As indicated in Table 3, these test pieces had small friction coefficients.

In contrast, when the hydrogen content of the DLC film was within a range from exceeding 30 at % to 40 at % or less, the detected amount of $Mo^0$ became large (more specifically, the ninth to 13th test pieces). It might be thought that this is because of the relationship with the root mean square roughness of the DLC film, but when the hydrogen content of the DLC film is within this range, the hardness of the DLC film has a certain degree of hardness. Accordingly, it can be thought that the frictional heat and the pressure generate the relatively large by-products like molybdenum oxide ($MoO_2$ and $MoO_3$), not only $MoS_2$. Moreover, it can be thought that the generated molybdenum oxide is reduced by hydrogen derived from the DLC film to produce metal molybdenum, and the molybdenum oxide reacts with carbon derived from the DLC film to generate molybdenum carbide. The generation of metal molybdenum and molybdenum carbide means the chemical wear of the DLC film, and thus it is indicated that the range where the hydrogen content of the DLC film exceeds 30 at % and 40 at % or less (the range "II" in FIG. 6A) is not preferable.

When the hydrogen content of the DLC film is within a range exceeding 40 at % (the range "III" in FIG. 6A), conversely, the detected amount of $Mo^0$ is as little as that of the range where the hydrogen content of the DLC film was 30 at % or less. As illustrated in Table 3, however, the friction coefficient does not become sufficiently small (more specifically, the 14th and 15th test pieces). It can be thought that this is because since the hydrogen content of the DLC film is large, i.e., the hardness of the DLC film (Young's modulus) is low and soft, sufficient frictional heat and pressure are not produced, and thus $MoS_2$ is not sufficiently produced.

The test piece having the hydrogen content of the DLC film that was smaller than 4.5 at % (the range "IV" in FIG. 6A) (more specifically, the 16th test piece) had excessively a little hydrogen content, i.e. excessively high hardness of the DLC film, and excessively high root mean square roughness thereof, thereby becoming more aggressive to the counterpart member. As a result, the wear of the ball member that was the counterpart member was intensive (see FIG. 4B). Although the friction coefficient of the 16th test piece did not remarkably become large in this friction test, a possible disadvantage is indicated when the 16th test piece slides against the counterpart member for a longer time than that of this friction test, and/or with larger load.

Based on the studied results with reference to Table 3 and FIGS. 3 to 6, the validity of the advantage and the conditions for accomplishing such an advantage are as follows:

(1) It is necessary that the DLC film containing hydrogen should be provided on either one member of the members sliding against each other, and the two members should be combined in such a way that the DLC film provided on the one member slides against the counterpart member via a lubricant to which organic molybdenum compound and compound containing zinc and sulfur are added as an additive.

(2) As becoming clear from Table 3 and FIGS. 4 and 5, in order to generate $MoS_2$ and to prevent the aggressiveness to the counterpart member from becoming too high, it is necessary that the root mean square roughness of the surface of the DLC film should be set in a range from 5 nm or more to 25 nm or less.

(3) As becoming clear from Table 3 and FIG. 6, in order to prevent the aggressiveness of the DLC film to the counterpart member from becoming too high, it is necessary that the hydrogen content of the DLC film should be set to 4.5 at % or more, and in order to suppress a chemical wear of the DLC film and a deterioration of various characteristics of the lubricant, the hydrogen content of the DLC film should be set to 30 at % or less.

Figure 7:
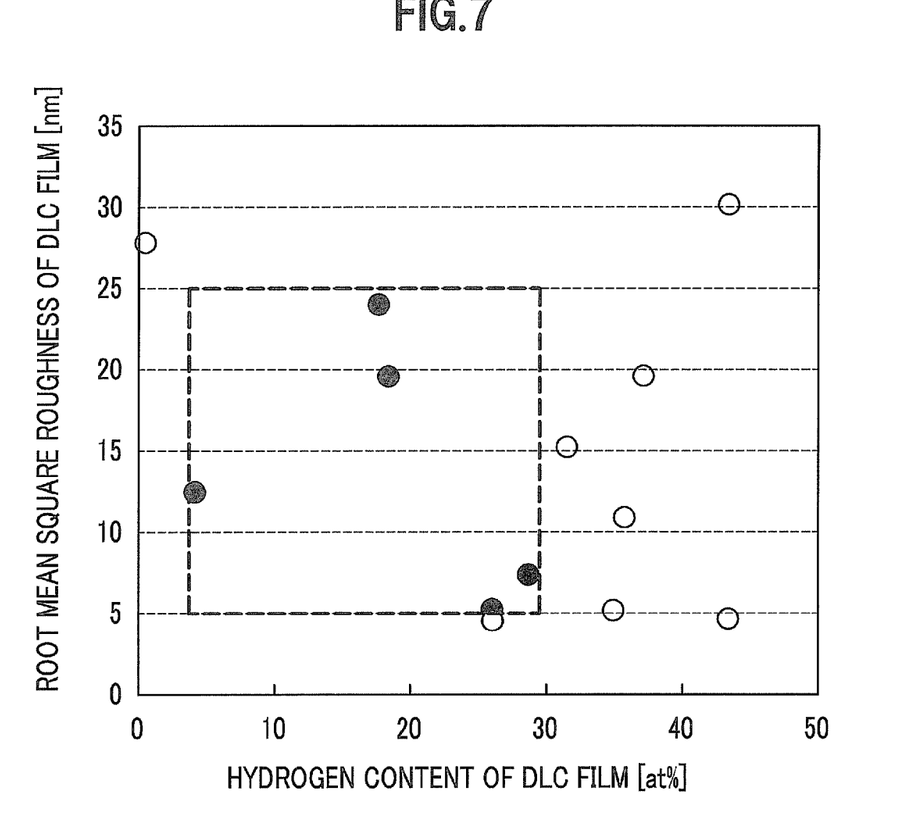
FIG. 7 is a graph plotted so as to indicate a relationship between hydrogen content of the DLC film and a root mean square roughness of the DLC film.

FIG. 7 illustrates the above-described (2) and (3) in an easy-to-understand manner. FIG. 7 is a graph plotted so as to indicate a relationship between hydrogen content of the DLC film and a root mean square roughness of the DLC film. The horizontal axis indicates the hydrogen content of the DLC film [at %], and the vertical axis indicates the root mean square roughness of the DLC film [nm].

A black circle within a range indicated by dashed lines in FIG. 7 is the above-described requirement (1) to (3), i.e., the first, and fifth to eighth test pieces satisfying the requirements of the present invention, and having small friction coefficients (examples). A white circle out of the range indicated by dashed lines in FIG. 7 are ninth to 16th test pieces which did not satisfy the above-described requirements (2) and (3), i.e., did not satisfy the requirements of the present invention, and thus a friction coefficient became large, aggressiveness to the counterpart member became high, and a generation amount of metal molybdenum and molybdenum carbide increased, resulting in a determination as being improper (comparative examples).

DESCRIPTION OF REFERENCE NUMERALS

1 Sliding structural member
11 Member
12 Counterpart member
2 Amorphous hard carbon film (DLC film)
3 Lubricant

The invention claimed is:

1. A sliding structural member applied to a power plant and a power transmission device, said sliding structural member comprising:
  a plurality of members comprising a first and second member configured to slide against each other wherein
  an amorphous hard carbon film containing hydrogen is provided on the first member, and the first member and the second member are combined such that the amorphous hard carbon film provided on the first member is configured to slide against the second member via a lubricant to which an organic molybdenum compound and a compound containing zinc and sulfur are added as an additive,
  a root mean square roughness of a surface of the amorphous hard carbon film is set in a range from 5 nm or more to 25 nm or less, and
  hydrogen content of the amorphous hard carbon film is set in a range from 4.5% or more to 30% or less.

* * * * *